US008756369B2

(12) United States Patent
McKean et al.

(10) Patent No.: US 8,756,369 B2
(45) Date of Patent: Jun. 17, 2014

(54) PRIORITY COMMAND QUEUES FOR LOW LATENCY SOLID STATE DRIVES

(75) Inventors: Brian D. McKean, Longmont, CO (US); Kevin Lee Kidney, Lafayette, CO (US); Jeremy Michael Pinson, Escondido, CA (US)

(73) Assignee: Netapp, Inc., Sunnyvale, CA (US)

( * ) Notice: Subject to any disclaimer, the term of this patent is extended or adjusted under 35 U.S.C. 154(b) by 800 days.

(21) Appl. No.: 12/238,438

(22) Filed: Sep. 26, 2008

(65) Prior Publication Data

US 2010/0082879 A1 Apr. 1, 2010

(51) Int. Cl.
*G06F 13/00* (2006.01)
*G06F 13/28* (2006.01)

(52) U.S. Cl.
USPC .... 711/112; 711/103; 711/170; 711/E12.002; 710/56; 710/6; 710/241

(58) Field of Classification Search
USPC ........ 711/112, 103, 170, E12.002; 710/6, 56, 710/241
See application file for complete search history.

(56) References Cited

U.S. PATENT DOCUMENTS

| 2007/0083703 | A1* | 4/2007 | Kolli et al. ..................... 711/112 |
| 2007/0106868 | A1* | 5/2007 | Moore et al. .................. 711/170 |
| 2008/0091876 | A1* | 4/2008 | Fujibayashi et al. .......... 711/113 |
| 2008/0126716 | A1* | 5/2008 | Daniels ......................... 711/154 |
| 2008/0288714 | A1* | 11/2008 | Salomon et al. .............. 711/103 |
| 2009/0043831 | A1* | 2/2009 | Antonopoulos et al. ...... 707/205 |

* cited by examiner

*Primary Examiner* — Edward Dudek, Jr.
(74) *Attorney, Agent, or Firm* — Haynes and Boone, LLP

(57) ABSTRACT

A method, apparatus, and system of a priority command queues for low latency solid state drives are disclosed. In one embodiment, a system of a storage system includes a command sorter to determine a target storage device for at least one of a solid state drive (SSD) command and a hard disk drive (HDD) command and to place the command in a SSD ready queue if the SSD command is targeted to a SSD storage device of the storage system and to place the HDD command to a HDD ready queue if the HDD command is targeted to an HDD storage device of the storage system, a SSD ready queue to queue the SSD command targeted to the SSD storage device, and a HDD ready queue to queue the HDD command targeted to the HDD storage device.

2 Claims, 7 Drawing Sheets

PRIORITY COMMAND QUEUES FOR LOW LATENCY SOLID STATE DRIVES

FIELD OF TECHNOLOGY

This disclosure relates generally to an enterprise method, a technical field of software and/or hardware technology and, in one example embodiment, to priority command queues for low latency solid state drives.

BACKGROUND

A storage system may be comprised of a number of solid state drives (SSD) (e.g. may use a semiconductor device to store data) and/or a number of hard disk drives (HDD) (e.g., may use a rotating platter with a magnetic surface to store data). A SSD storage device may have a lower command latency rate (e.g., a time delay between the moment a command is initiated and the moment the command's first effect begins) than an HDD storage device. For example, an HDD storage device's average command response time may be on the order milliseconds. In contrast, a SSD storage device's average command response time may be on the order microseconds. Consequently, a variation in performance may exist between the SSD storage device and the HDD storage device. As a result of the variation in performance, a set of SSD commands in the command queue may be serviced faster than a set of HDD commands. The command queue may empty of SSD commands. A newly arrived SSD command may then have to wait longer in the command queue than is necessary in order for the slower HDD storage device to respond to the set of HDD commands in the queue. Thus, this difference in latency rates may create a throughput disparity in a command queue used by both a SSD command and an HDD command. The throughput disparity may cause a SSD command latency period to increase. The longer SSD command latency period may cause the SSD storage device to be underutilized. The longer SSD command latency period may also diminish the performance value of the storage system.

SUMMARY

A method, apparatus, and system of a set of priority command queues for low latency solid state drives are disclosed. In one aspect, a system of a storage system includes a command sorter to determine a target storage device for at least one of a solid state drive (SSD) command and a hard disk drive (HDD) command and to place the command in a SSD ready queue if the SSD command is targeted to a SSD storage device of the storage system and to place the HDD command to a HDD ready queue if the HDD command is targeted to an HDD storage device of the storage system, a SSD ready queue to queue the SSD command targeted to the SSD storage device, and a HDD ready queue to queue the HDD command targeted to the HDD storage device.

The system may include a command scheduler to determine an availability level of a SSD process queue and/or a HDD process queue and to communicate the SSD command to the SSD ready queue and/or the HDD command from the HDD ready queue to a command processor according to the availability level. The command processor may communicate the command to the SSD process queue and/or the HDD process queue according to a scheduling instruction from the command scheduler.

The SSD storage device may be a non-volatile computer memory that may be electrically erasable and/or reprogrammable. The command sorter may use a hash table and/or a data mapping table to determine a command type. The storage system may be a system that may share and/or replicate data using a HDD disk drive and a SSD storage device. The system may include multiple SSD storage devices and/or multiple HDD storage devices. There may be a single SSD ready queue for the storage system. There may be a single HDD ready queue for the storage system. Each SSD storage device may have a unique SSD process queue. Each HDD storage device may have a unique HDD process queue.

The SSD storage device may use a NAND flash architecture. The storage system may be a redundant array of independent disks (RAID) system having both HDD disk drives and SSD storage devices. The SSD storage device and/or the HDD storage device may be peer storage subsystems of the RAID system. The system may include a spun down HDD ready queue. The command sorter may further determine that a spun down HDD command may be targeted to a spun down HDD storage device. The command sorter may place the spun down HDD command in a spun down HDD ready queue. The command processor may place the spun down HDD command in a spun down HDD process queue.

In another aspect, a method of a storage system includes determining a target storage device of the storage system for a at least one of a solid state drive (SSD) command and a hard disk drive (HDD) command, placing the SSD command in a SSD ready queue if the SSD command is targeted to a SSD storage device of the storage system, and placing the HDD command in a HDD ready queue if the HDD command is targeted to an HDD storage device of the storage system.

The method may include determining a latency period of the SSD command. The method may also determine another latency period of the HDD command. In addition, the method may proportionately allocate a set of storage system resources to service the SSD command in the SSD ready queue at a faster rate than the HDD command in the HDD ready queue according to the difference between the latency period of the SSD command and the other latency period of the HDD command. The method may include determining an availability level of a SSD process queue. The method may determine another availability level of a HDD process queue. The method may also place the SSD command located in the SSD ready queue in a command processor if the availability level of the SSD process queue is greater than the other availability level of the HDD process queue. In addition, the method may place the HDD command located in the HDD ready queue in the command processor if the other availability level of the HDD process queue is greater than the availability level of the SSD process queue.

The storage system may have a hybrid storage device that has both a SSD storage component and an HDD storage component. The method may include determining an availability level of a SSD component process queue. The method may determine another availability level of a HDD component process queue. The method may also place the SSD command located in the SSD component ready queue in a component command processor if the SSD component process queue has a greater availability level than the HDD component process queue. In addition, the method may place the HDD command located in the HDD component ready queue in the component command processor if the HDD component process queue has a greater availability level than the SSD component process queue.

The storage may be a redundant array of independent disks (RAID) system having both HDD disk drives and/or SSD storage devices. The SSD storage device and/or the HDD storage device may be peer storage subsystems of the RAID system. The SSD storage device may use a NAND flash architecture as a computer memory.

In yet another aspect, a method includes configuring a computer storage system with both a solid state drive (SSD) data storage device and a hard disk drive data storage device, configuring a command sorter to determine if a command is assigned to at least one of the SSD data storage device and the HDD data storage device, configuring the command sorter to place the command assigned to the SSD data storage device in a SSD ready queue, and configuring the command sorter to place the command assigned to the HDD data storage device in an HDD ready queue.

The method may include determining an availability of a SSD process queue and an HDD process queue. The method may configure a command scheduler to take the command assigned to the SSD data storage device and place it in a command processor if the SSD process queue has a greater availability than the HDD process queue. The method may include configuring the command scheduler to take the command assigned to the HDD data storage device and place it in the command processor if the HDD process queue has a greater availability than the SSD process queue.

The method may include configuring a computer storage device of the computer storage system with a hybrid data storage device that has both a SSD data sub-storage device and a HDD sub-storage device and wherein the hybrid data storage device is a peer device to the SSD data storage device and the HDD data storage device. The method may determine if the command is assigned to the SSD data sub-storage device or the HDD data sub-storage device. The method may also place the command assigned to the SSD data sub-storage device in a SSD ready sub-queue. In addition, the method may place the command assigned to the HDD data sub-storage device in an HDD ready sub-queue. Thus, the method may proportionately allocate resources of a computer storage system to accommodate commands targeted to faster storage devices.

The method may include determining an availability of a SSD process sub-queue and an HDD process sub-queue. The method may configure a command sub-scheduler to take the command assigned to the SSD data sub-storage device and place it in a command sub-processor if the SSD process sub-queue has a greater availability than the HDD process sub-queue. In addition, the method may configure the command sub-scheduler to take the command assigned to the HDD data sub-storage device and place it in the command sub-processor if the HDD process sub-queue may have a greater availability than the SSD process sub-queue.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of a priority command queues for low latency solid state drives are disclosed. Although the present embodiments have been described with reference to specific example embodiments, it will be evident that various modifications and changes may be made to these embodiments without departing from the broader spirit and scope of the various embodiments.

In one embodiment, a system of a storage system includes a command sorter (e.g., the command sorter 200 of FIG. 2) to determine a target storage device for a solid state drive (SSD) command and a hard disk drive (HDD) command and to place the command in a SSD ready queue (e.g., the SSD ready queue 204 of FIG. 2) if the SSD command is targeted to a SSD storage device (e.g., the SSD storage device 224A-N of FIG. 2) of the storage system and to place the HDD command to a HDD ready queue (e.g., the HDD ready queue 206 of FIG. 2) if the HDD command is targeted to an HDD storage device (e.g., the HDD storage device 226A-N of FIG. 2) of the storage system, a SSD ready queue (e.g., the SSD ready queue 204 of FIG. 2) to queue the SSD command targeted to the SSD storage device 224A-N, and a HDD ready queue 206 to queue the HDD command targeted to the HDD storage device 226A-N. The command sorter 200 may use a set of hash tables (e.g. a data structure that associates keys with values) and/or a set of data mapping tables to determine a target storage device of the command.

In another embodiment, a method of a storage system includes determining a target storage device of the storage system for a solid state drive (SSD) command and a hard disk drive (HDD) command, placing the SSD command in a SSD ready queue (e.g., the SSD ready queue 204 of FIG. 2) if the SSD command is targeted to a SSD storage device (e.g., the SSD storage device 224A-N of FIG. 2) of the storage system, and placing the HDD command in a HDD ready queue (e.g., the HDD ready queue 206 of FIG. 2) if the HDD command is targeted to an HDD storage device (e.g., the HDD storage device 226A-N of FIG. 2) of the storage system.

Figure 2:
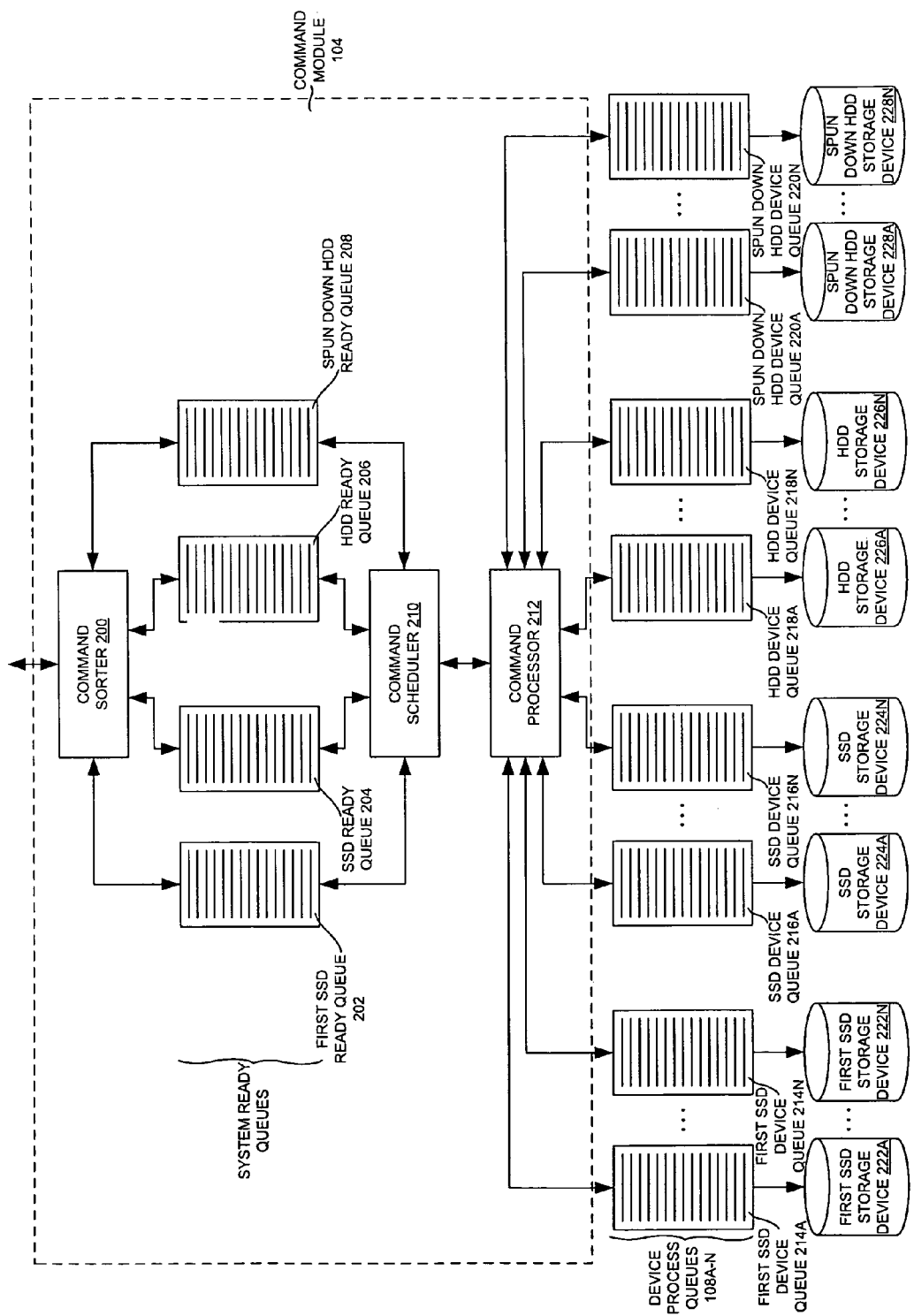
FIG. 2 is a system view of the command module where a command processor communicating with a devices process queue, according to one embodiment.

In yet another embodiment, a method includes configuring a computer storage system with both a solid state drive (SSD) data storage device (e.g., may be the SSD storage device 224A-N of FIG. 2) and a hard disk drive data storage device (e.g., may be the HDD storage device 226A-N of FIG. 2), configuring a command sorter (e.g., the command sorter 200 of FIG. 2) to determine if a command is assigned to at least one of the SSD data storage device 224A-N and the HDD data storage device 226A-N, configuring the command sorter 200 to place the command assigned to the SSD data storage device 224A-N in a SSD ready queue (e.g., the SSD ready queue 204 of FIG. 2), and configuring the command sorter 200 to place the command assigned to the HDD data storage device 226A-N in an HDD ready queue (e.g., the HDD ready queue 206 of FIG. 2).

Figure 1:
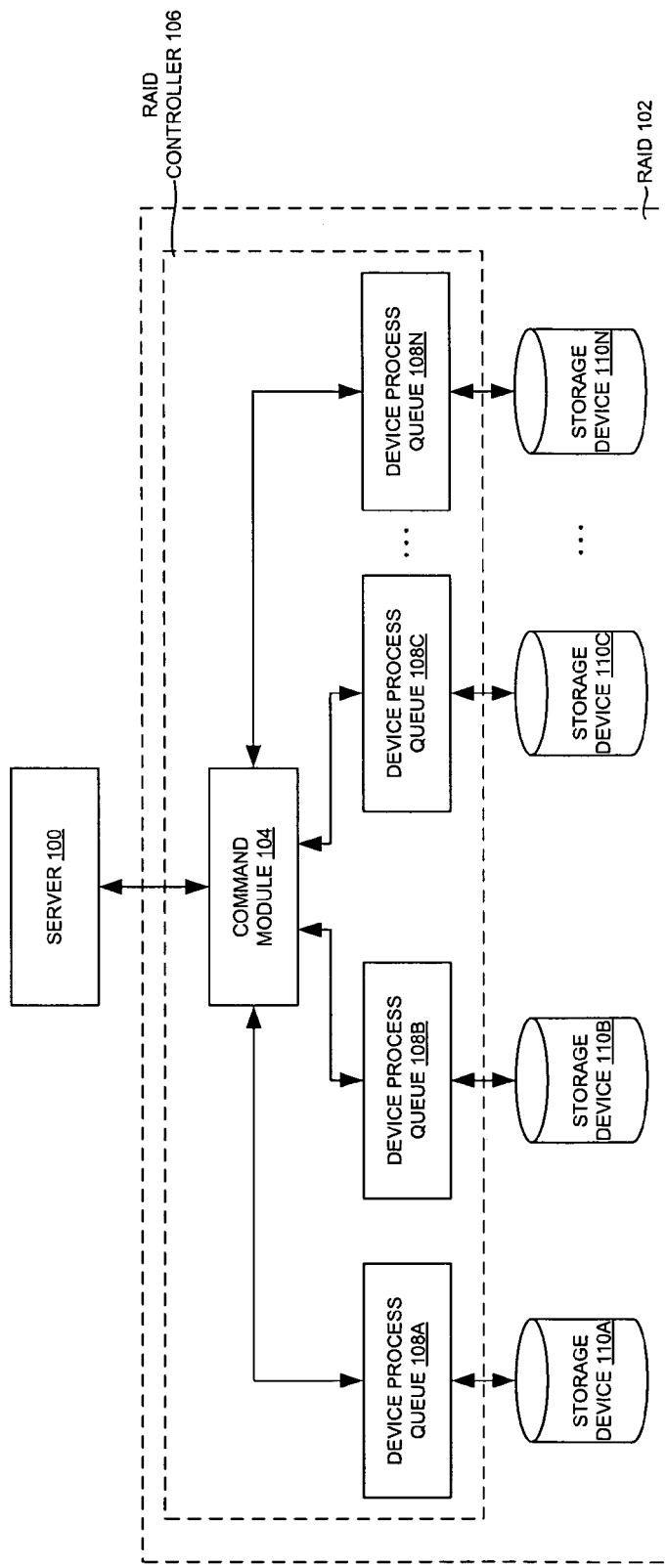
FIG. 1 is a system view of a RAID that includes a RAID controller, and a command module communicating with a server, according to one embodiment.

FIG. 1 is a system view of a RAID (e.g., the RAID 102 of FIG. 1) that includes a RAID controller (e.g., the RAID controller 106 of FIG. 1), and a command module (e.g., the command module 104 of FIG. 1) communicating with a server (e.g., the server 100 of FIG. 1), according to one embodiment. Particularly, FIG. 1 illustrates a server 100, a RAID 102, a command module 104, a RAID controller 106, a device process queue 108A-N (e.g. a first SSD devise queue 214A-N, a SSD devise queue 216A-N, a HDD devise queue 218A-N, a spun down HDD devise queue 220 A-N), and a storage device 110A-N, according to one embodiment. These devices may be real (e.g. a real machine in hardware) and/or virtual (e.g. a software implementation of a computer that executes programs like a real machine).

The server 100 may be a web server, a host of a community pausing network, a server application, an operating system, a computer, and/or an appliance having data content (e.g., video, audio, etc.). The server 100 may be both in software and/or hardware. The server 100 may be a computer dedicated to providing one or more services over a computer network. The server 100 may use a request-response routine.

The RAID 102 may be a storage device 110A-N and/or the memory system (e.g., hard disk, server, etc.) that may have HDD disk drives, and SSD storage devices 224A-N to receive the data from the sources (e.g., may be from network, from the data buffer, etc.). SSD storage devices 224A-N may be different types of solid state storage devices (e.g. using SRAM and/or DRAM, uses NAND flash architecture, etc.). The command module 104 may process a command (e.g., determine the availability of a command queue, communicate a command to an appropriate queue) to the device process queue 108A-N (e.g. a first SSD devise queue 214A-N, a SSD devise queue 216 A-N, a HDD devise queue 218A-N, a spun down HDD devise queue 220A-N). The RAID controller 106 may be a hardware/software that may process the commands and data communication between the server 100 and the storage devices 110A-N. The device process queue 108A-N (e.g. first SSD may be the device queue that may queue the commands (e.g., read, modify, write, etc.) given by the command processor 212 and may further proceed the queue to respective storage devices.

The storage device 110A-N may be the device (e.g., may be the RAID system that may include the HDD disk drives and/or the SSD storage device 224A-N) that receives and retains data for subsequent retrieval/processing.

In an example embodiment, the server 100 may communicate (e.g. may communicate a command) with the command module 104. The RAID system 102 may include the RAID controller 106. The RAID controller 106 may include the command module 104. The command module 104 may communicate with the device process queue 108A-N. The device process queue 108A-N may communicate with the storage device 110A-N.

In one embodiment, the storage may be a RAID system (e.g., may be the RAID 102 of FIG. 1) having both HDD disk drives and/or SSD storage devices 224A-N. The SSD storage device 224A-N and/or the HDD storage device 226A-N may be peer storage subsystems of the RAID system (e.g., may be the RAID 102 of FIG. 1). A storage device may contain both an SSD storage device and an HDD storage device.

FIG. 2 is a system view of the command module where a command processor communicating with a device process queue, according to one embodiment. Particularly, FIG. 2 illustrates the command module 104, a command sorter 200, a first SSD ready queue 202, a SSD ready queue 204, a HDD ready queue 206, a spun down HDD ready queue 208, a command scheduler 210, a first SSD device queue 214A-N, a SSD device queue 216A-N, a HDD device queue 218A-N, a spun down HDD device queue 220A-N, a first SSD storage device 222A-N, a SSD storage device 224A-N, a HDD storage device 226A-N, and a spun down HDD storage device 228A-N, according to one embodiment. All devices may be real (e.g. a real machine in hardware) and/or virtual (e.g. a software implementation of a computer that executes programs like a real machine). The first SSD storage device may be of a different type than the SSD storage device.

The command sorter 200 may determine (e.g., may use the hash table and a data mapping table) the HDD command (e.g., may be targeted to the HDD storage device 226A-N) to place in the HDD ready queue and/or may be configured to place the command assigned to the SSD data storage device in a SSD ready queue 204. The command sorter 200 may also determine whether a command is a spun down HDD command to be placed in the spun down HDD storage device (may be targeted to the spun down HDD storage device 228A-N). An HDD storage device 228A-N may be spun down to conserve power during periods of limited use. An HDD storage device 228A-N (e.g., spun down) may also be in a lower power mode where a disk rotation has been slowed and/or stopped. The HDD storage device 228A-N may require a period of time to accelerate the disk to an operational rotational speed prior to servicing a command. The first SSD ready queue 202 may be the initial ready queue that may queue the SSD command targeted to the SSD storage devices 224A-N. The SSD ready queue 204 may be the ready queue (e.g., may include the SSD command) that may queue the SSD command targeted to the SSD storage devices 224A-N. The HDD ready queue 206 may be the ready queue (e.g., may include the HDD command) that may queue the HDD command targeted to the HDD storage device 226A-N.

The spun down HDD ready queue 208 which may be determined by the command sorter 200 (e.g., may place the spun down HDD command in a spun down HDD ready queue 208) and may be targeted to the spun down HDD storage device 228A-N. The command scheduler 210 may be configured to take the command assigned to a particular data storage device (e.g., HDD, spun down HDD, and/or SSD of any type) and place it in the command processor 212 if the particular process queue ((e.g., HDD process queue, spun down HDD process queue, and/or SSD process queue of any type) has a greater availability than the process queue.

The first SSD device queue 214A-N may be the initial device queue that may queue the commands (e.g., read, modify, write, etc.) given by the command processor 212 and may further proceed the queue to the first SSD storage device 222A-N. The SSD device queue 216A-N may be the device queue that may queue the commands (e.g., read, modify, write, etc.) given by the command processor 212 and may further proceed the queue to the SSD storage device 224A-N. The HDD device queue 218A-N may be the device queue that may queue the commands (e.g., read, modify, write, etc.) given by the command processor 212 and may further proceed the queue to the HDD storage device 226A-N. The spun down HDD device queue 220A-N may be the device queue that may queue the commands (e.g., read, modify, write, etc.)

given by the command processor 212 and may further proceed the queue to the spun down HDD storage device 228A-N.

The first SSD storage device 222A-N may be the initial SSD storage (e.g., may be the redundant array of independent disks (RAID) system that may include the SSD disk drives) device that may use a NAND flash architecture. Flash architecture may use a flash memory. The flash memory may be a non-volatile computer memory that can be electrically erased and reprogrammed. A NAND gate flash may use a tunnel injection for writing and a tunnel release for erasing. The SSD storage device 224A-N may be another SSD storage (e.g., may be the redundant array of independent disks (RAID) system that may include the SSD disk drives) device that may use a NAND flash architecture as well.

In an example embodiment, the command module 104 may include the command sorter 200, the system ready queues, the command scheduler 210, and the command processor 212. The command sorter 200 may communicate with the first SSD ready queue 202, the SSD ready queue 204, the HDD ready queue 206, and the spun down HDD ready queue 208. The command scheduler 210 may also communicate with the first SSD ready queue 202, the SSD ready queue 204, the HDD ready queue 206, and the spun down HDD ready queue 208. All devices may be real (e.g. a real machine in hardware) and/or virtual (e.g. a software implementation of a computer that executes programs like a real machine). The first SSD storage device may be of a different type than the SSD storage device.

The command scheduler 210 may communicate with the command processor 212. The command processor 212 may communicate with the first SSD device queue 214A-N, the SSD device queue 216A-N, the HDD device queue 218A-N, and the spun down HDD device queue 220A-N. The first SSD device queue 214A-N may communicate with the first SSD storage device 222A-N. The SSD device queue 216A-N may communicate with the SSD storage device 224A-N. The HDD device queue 218A-N may communicate with the HDD storage device 226A-N. The spun down HDD device queue 220A-N may communicate with the spun down HDD storage device 228A-N.

In one embodiment, the command sorter 200 may determine the target storage device for the solid state drive (SSD) command and/or the hard disk drive (HDD) command and place the command in the SSD ready queue 204 if the SSD command is targeted to the SSD storage device 224A-N of the storage system and place the HDD command in the HDD ready queue 206 if the HDD command is be targeted to the HDD storage device 226A-N of the storage system. The SSD ready queue 204 may queue the SSD command targeted to the SSD storage device 224A-N. The HDD ready queue 206 may queue the HDD command targeted to the HDD storage device 226A-N.

The command scheduler 210 may determine the availability level of the SSD process queue and the HDD process queue and communicate the SSD command from the SSD ready queue 204 and the HDD command from the HDD ready queue 206 to the command processor 212 according to the availability level. The command processor 212 may communicate the command to the SSD process queue and the HDD process queue according to a scheduling instruction from the command scheduler 210.

The SSD storage device 224A-N may be the non-volatile computer memory that may be electrically erasable and/or reprogrammable. The command sorter 200 may use the hash table and the data mapping table to determine whether the command type. The storage system may be the system that shares and/or replicates data using the HDD disk drive and the SSD storage device 224A-N. There may be SSD storage devices 224A-N and/or the HDD storage devices 226A-N. There may be the single SSD ready queue for the storage system. There may a single HDD ready queue for the storage system. Each SSD storage device (e.g., of the SSD storage device 224A-N) may have a unique SSD process queue. Each HDD storage device (e.g., of the HDD storage devices 226A-N) may have the unique HDD process queue. The SSD storage device 224A-N may use the NAND flash architecture.

The spun down HDD ready queue 208 to queue another HDD command targeted to a spun down HDD storage device. The command sorter 200 may further determine that the spun down HDD command may be targeted to the spun down HDD storage device 228A-N. The command sorter 200 may place the spun down HDD command in the spun down HDD ready queue 208. The command processor 212 may place the spun down HDD command in the spun down HDD process queue.

The target storage device of the storage system may be determined for the solid state drive (SSD) command and/or the hard disk drive (HDD) command. The SSD command may be placed in the SSD ready queue 204 if the SSD command may be targeted to the SSD storage device 224A-N of the storage system. The HDD command may be placed in the HDD ready queue 206 if the HDD command may be targeted to the HDD storage device 226A-N of the storage system. The latency period of the SSD command may be determined. A latency period may be a time between when the server requests a specific data and a time when the specific data is actually sent. The other latency period of the HDD command may be determined. The set of storage system resources may be proportionately allocated to service the SSD command in the SSD ready queue 204 at the faster rate than the HDD command in the HDD ready queue 206 according to the difference between the latency period of the SSD command and/or the other latency period of the HDD command.

The availability level of the SSD process queue may be determined (e.g. may be determined by the command scheduler 210). The other availability level of the HDD process queue may be determined (e.g. may be determined by the command scheduler 210). The SSD command located in the SSD ready queue 204 may be placed in the command processor 212 if the availability level of the SSD process queue may be greater than the other availability level of the HDD process queue. The HDD command located in the HDD ready queue 206 may be placed in the command processor 212 if the other availability level of the HDD process queue may be greater than the availability level of the SSD process queue.

The storage system may have a hybrid storage device that has both the SSD storage component and/or the HDD storage component. The availability level of the SSD component process queue may be determined. The other availability level of the HDD component process queue may be determined. The SSD command located in the SSD component ready queue may be placed in the component command processor if the SSD component process queue may have the greater availability level than the HDD component process queue.

The HDD command located in the HDD component ready queue may be placed in the component command processor if the HDD component process queue may have the greater availability level than the SSD component process queue. The SSD storage devices 224A-N may use the NAND flash architecture as the computer memory.

The computer storage system may be configured with both the solid state drive (SSD) data storage device and/or the hard disk drive data storage device. The command sorter 200 may be configured to determine if the command may be assigned to the SSD data storage device and/or the HDD data storage device. The command sorter 200 may be configured to place the command assigned to the SSD data storage device in the SSD ready queue 204. The command sorter 200 may be configured to place the command assigned to the HDD data storage device in the HDD ready queue 206. The availability of the SSD process queue and/or the HDD process queue may be determined.

The command scheduler 210 may be configured to take the command assigned to the SSD data storage device and place it in the command processor 212 if the SSD process queue may have the greater availability than the HDD process queue. The command scheduler 210 may be configured to take the command assigned to the HDD data storage device and place it in the command processor 212 if the HDD process queue may have the greater availability than the SSD process queue. The computer storage device of the computer storage system may be configured with the hybrid data storage device that may have both the SSD data sub-storage device and/or the HDD sub-storage device.

The hybrid data storage device may be a peer device to a SSD-type data storage device and/or a HDD-type data storage device. It may be determined if the command is assigned to the SSD data sub-storage device and/or the HDD data sub-storage device. The command assigned to the SSD data sub-storage device may be placed in the SSD ready sub-queue. The command assigned to the HDD data sub-storage device may be placed in the HDD ready sub-queue.

The availability of the SSD process sub-queue and/or the HDD process sub-queue may be determined. The command sub-scheduler may be configured to take the command assigned to the SSD data sub-storage device and place it in the command sub-processor if the SSD process sub-queue may have the greater availability than the HDD process sub-queue. The command sub-scheduler may be configured to take the command assigned to the HDD data sub-storage device and place it in the command sub-processor if the HDD process sub-queue may have the greater availability than the SSD process sub-queue.

Figure 3:
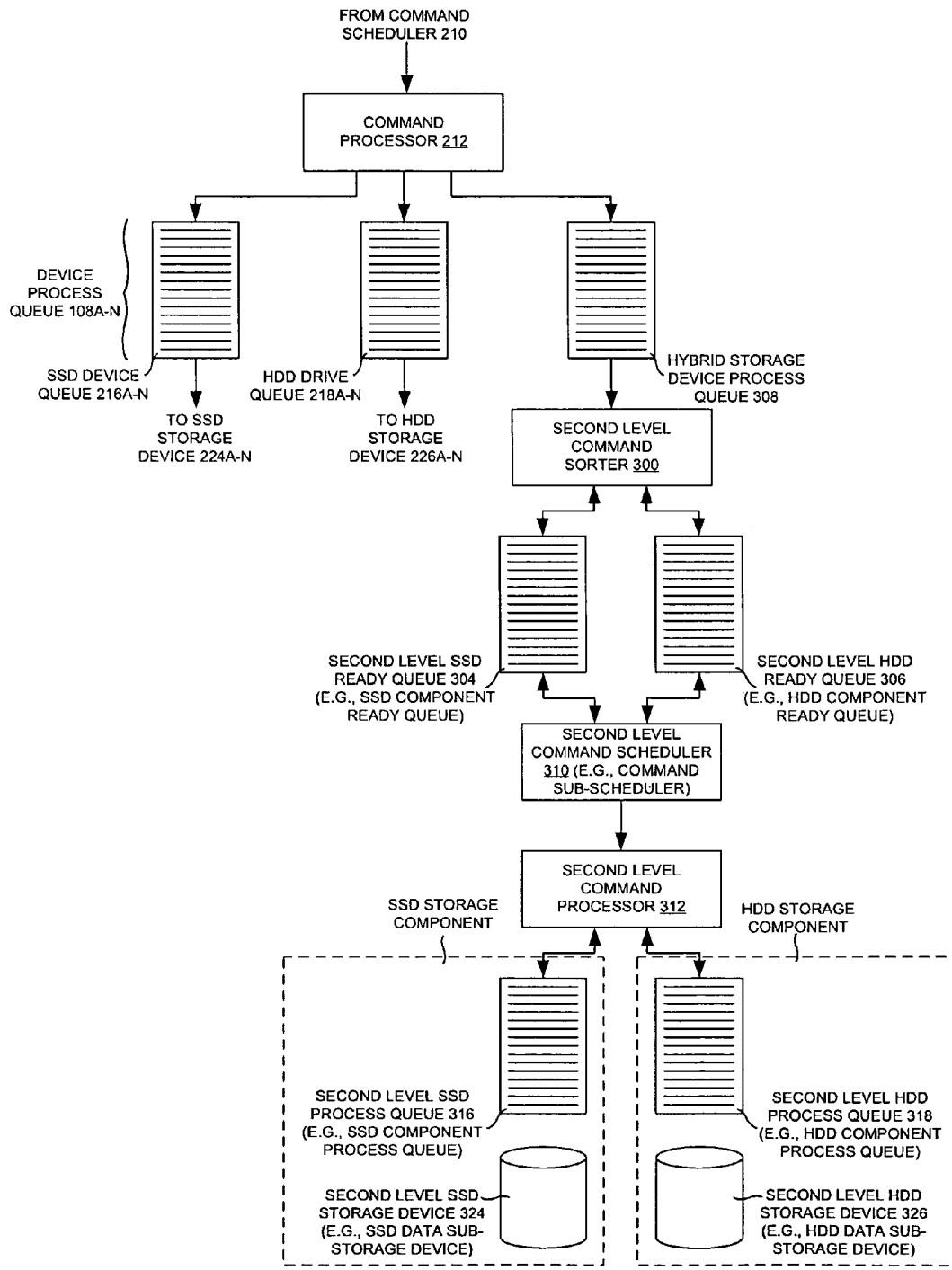
FIG. 3 is a system view of the command processor communicating the command to a SSD process queue, and a HDD process queue, according to one embodiment.

FIG. 3 is a system view of the command processor communicating the command to a SSD process queue, and a HDD process queue, according to one embodiment. Particularly, FIG. 3 illustrates the command processor 212, the SSD device queue 216, the HDD device queue 218, a second level command sorter 300, a second level SSD ready queue 304, a second level HDD ready queue 306, a hybrid storage device process queue 308, a second level command scheduler 310, a second level command processor 312, a second level SSD process queue 316, a second level HDD process queue 318, a second level SSD storage device 324, a second level HDD storage device 326, according to one embodiment.

The second level command sorter 300 may be the device in the sub-system of a storage device that may determine (e.g., may use the hash table and a data mapping table) the target of the command (e.g., may be targeted to the HDD sub-storage device or the SDD sub-storage device). The second level SSD ready queue 304 (e.g., SSD component ready queue) may be the ready sub-queue in the sub-system that may queue the SSD command targeted to the SSD sub-storage device. The second level HDD ready queue 306 (e.g., HDD component ready queue) may be the ready sub-queue in the sub-system that may queue the HDD command targeted to the HDD sub-storage device.

The hybrid storage device process queue 308 may be configured as a computer storage device of the computer storage system with a hybrid data storage device (e.g., may be peer device to the SSD data storage device and/or the HDD data storage device) that may include both the SSD data sub-storage device and/or the HDD sub-storage device.

The second level command scheduler 310 (e.g., command scheduler) in the sub-system of the storage device may be configured to communicate the command assigned to the data sub-storage device (e.g., may be the HDD and/or the SSD) and place it in the second level command processor if the process sub-queue (e.g., may be the HDD and/or the SSD) has a greater availability than another process sub-queue (e.g., may be SSD and/or the SSD).

The second level command processor 312 (e.g. command sub-processor) may send the command to the second level SSD process queue 316 (e.g., SSD component process queue) and the second level HDD process queue 318 (e.g., HDD component process queue) according to a scheduling instruction from the second level command scheduler 310. The second level command processor 312 (e.g. command sub-processor) may be the device queue that may queue the commands (e.g., read, modify, write, etc.) given by the second level command processor 312. The second level SSD process queue (e.g. SSD component process queue) may queue a command targeted to the second level SSD storage device 324 (e.g., may be SSD data sub-storage device). The second level HDD process queue 318 (e.g. HDD component process queue) may queue a command targeted to the second level HDD storage device 326 (e.g., may be SSD data sub-storage device). The second level SSD storage device 324 (e.g., SSD data sub-storage device) may be another SSD-type storage (e.g., may be the redundant array of independent disks (RAID) system that may include the SSD disk drives) device that may use a NAND flash architecture as well. The second level HDD storage device 326 (e.g., HDD sub-storage device) may be another HDD-type storage (e.g., may be the redundant array of independent disks (RAID) system that may include the HDD disk drives) device.

In example embodiment, the command processor 212 may communicate with the device process queue 108A-N (e.g. a first SSD devise queue 214A-N, a SSD devise queue 216A-N, a HDD devise queue 218A-N, a spun down HDD devise queue 220A-N). The device process queue 108A-N may also be the SSD device queue 216A-N, the HDD device queue 218A-N and the hybrid storage device process queue 308 as shown in FIG. 3. The hybrid storage device process queue 308 (e.g. a type of device process queue) may further communicate with the second level command sorter 300 and may queue a list of commands targeted a second level SSD storage device 324 (e.g. SSD data sub-storage device) and/or a second level HDD storage device 326 (e.g. HDD data sub-storage device). The second level command sorter 300 may further communicate with the second level SSD ready queue 304 (e.g., SSD component ready queue) and the second level HDD ready queue 306 (e.g., HDD component ready queue). The second level SSD ready queue 304 and the second level HDD ready queue 306 may communicate with the second level command scheduler 310. The second level command scheduler 310 may communicate with the second level command processor 312. The second level command processor 312 may communicate with the components in the SSD storage component and the HDD storage component. The SSD storage component may include the second level SSD process queue 316 (e.g., SSD component process queue) and the second level SSD storage device 324 (e.g., SSD data sub-storage device). The HDD storage component may include the second level HDD process queue 318 (e.g., HDD component storage device) and the second level HDD storage device 326 (e.g., HDD sub-storage device). The second level SSD process queue 316 may communicate with the second level SSD storage device 324 (e.g., SSD data sub-storage device). The second level HDD process queue 318 (e.g., HDD component storage device) may communicate with the second level HDD storage device 326 (e.g., HDD sub-storage device).

Figure 4A:
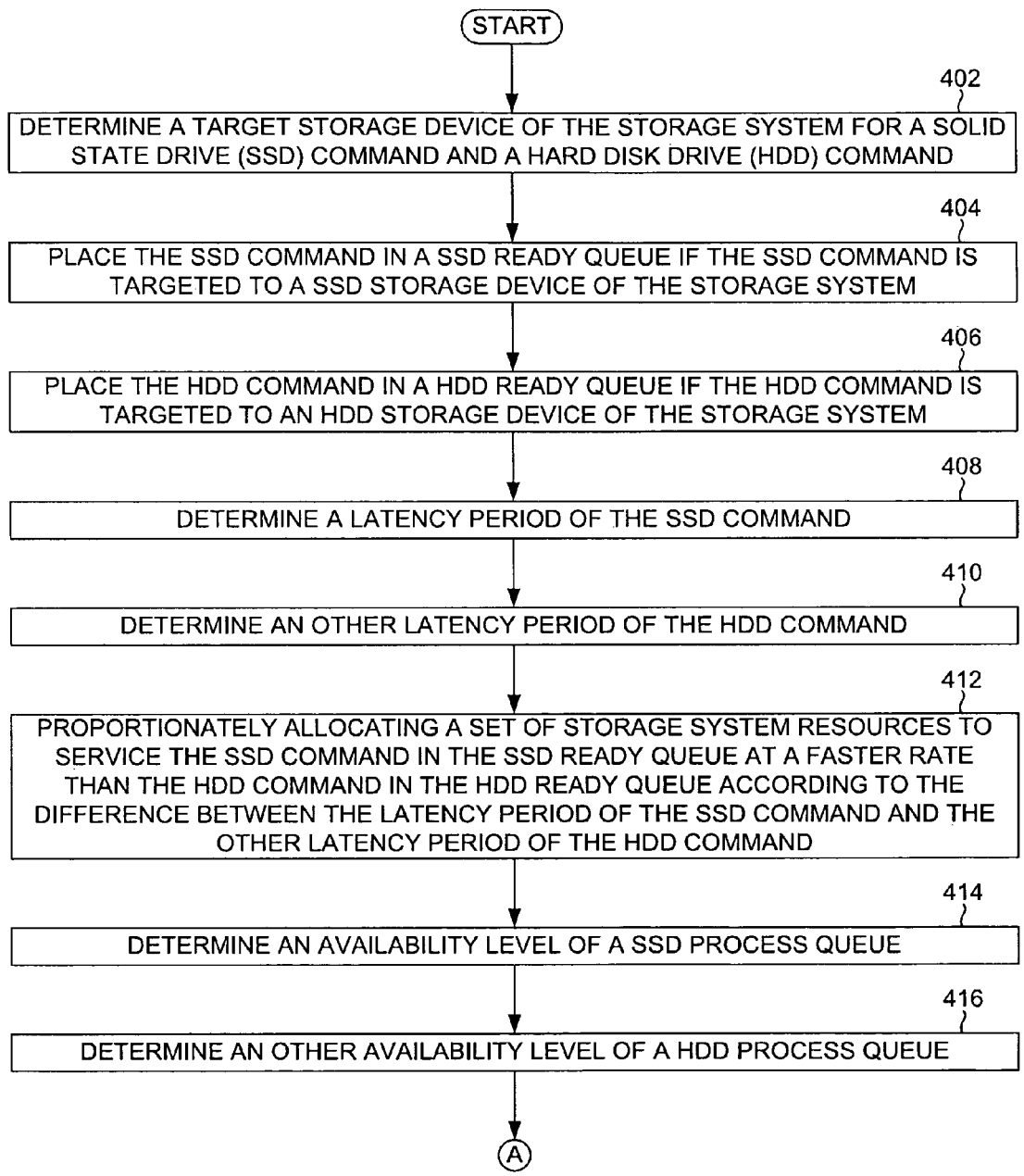
FIG. 4A is a process flow for determining a target storage device of the storage system for a solid state drive (SSD) command and a hard disk drive (HDD) command, according to one embodiment.

FIG. 4A is a process flow of determining a target storage device of the storage system for a solid state drive (SSD) command and a hard disk drive (HDD) command, according to one embodiment. In operation 402, a target storage device of the storage system may be determined for a solid state drive (SSD) command and/or a hard disk drive (HDD) command. In operation 404, the SSD command may be placed in a SSD ready queue 204 if the SSD command may be targeted to the SSD storage devices 224A-N of the storage system. In operation 406, the HDD command may be placed in a HDD ready queue 206 if the HDD command may be targeted to an HDD storage device (e.g., the HDD storage device 226A-N of FIG. 2) of the storage system.

In operation 408, a latency period of the SSD command may be determined. In operation 410, another latency period of the HDD command may be determined. In operation 412, a set of storage system resources may be proportionately allocated to service the SSD command in the SSD ready queue 204 at a faster rate than the HDD command in the HDD ready queue 206 according to the difference between the latency period of the SSD command and/or the other latency period of the HDD command. In operation 414, an availability level of a SSD process queue may be determined. In operation 416, another availability level of a HDD process queue may be determined.

Figure 4B:
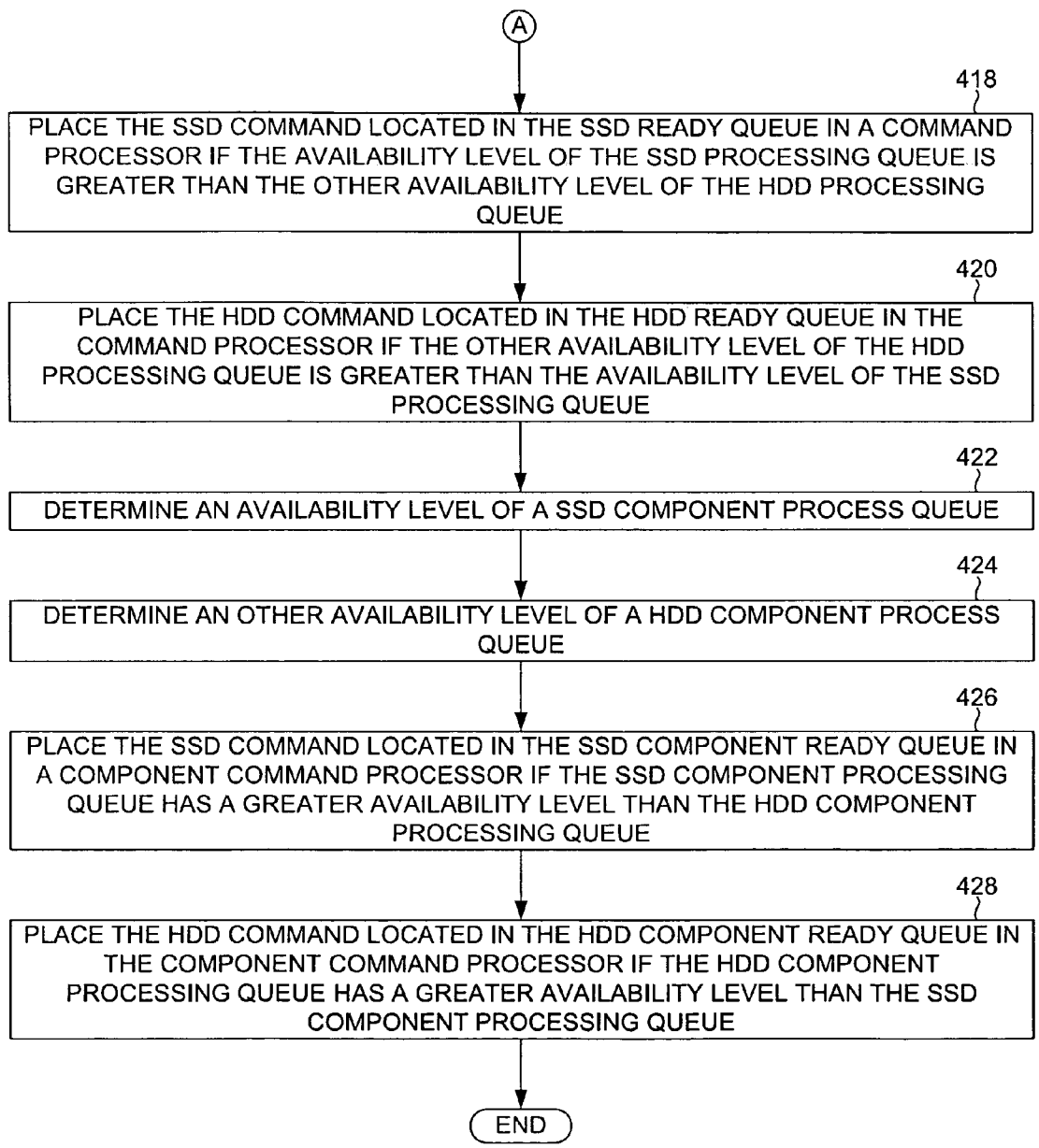
FIG. 4B is a continuation of the process flow of FIG. 4A having additional processes, according to one embodiment.

FIG. 4B is a continuation of the process flow of FIG. 4A having additional processes, according to one embodiment. In operation 418, the SSD command located in the SSD ready queue 204 may be placed in a command processor 212 if the availability level of the SSD process queue may be greater than the other availability level of the HDD process queue. In operation 420, the HDD command located in the HDD ready queue 206 may be placed in the command processor 212 if the other availability level of the HDD process queue may be greater than the availability level of the SSD process queue. The storage system may have a hybrid storage device that has both a SSD storage component and/or an HDD storage component.

In operation 422, an availability level of a SSD component process queue may be determined. In operation 424, another availability level of a HDD component process queue may be determined. In operation 426, the SSD command located in the SSD component ready queue may be placed in a component command processor if the SSD component process queue may have a greater availability level than the HDD component process queue. In operation 428, the HDD command located in the HDD component ready queue may be placed in the component command processor if the HDD component process queue may have a greater availability level than the SSD component process queue.

The storage may be a redundant array of independent disks (RAID) system having both HDD disk drives and/or SSD storage devices 224A-N. The SSD storage devices 224A-N and/or the HDD storage device 226A-N may be peer storage subsystems of the RAID 102 system. The SSD storage devices 224A-N may use a NAND flash architecture as a computer memory.

Figure 5A:
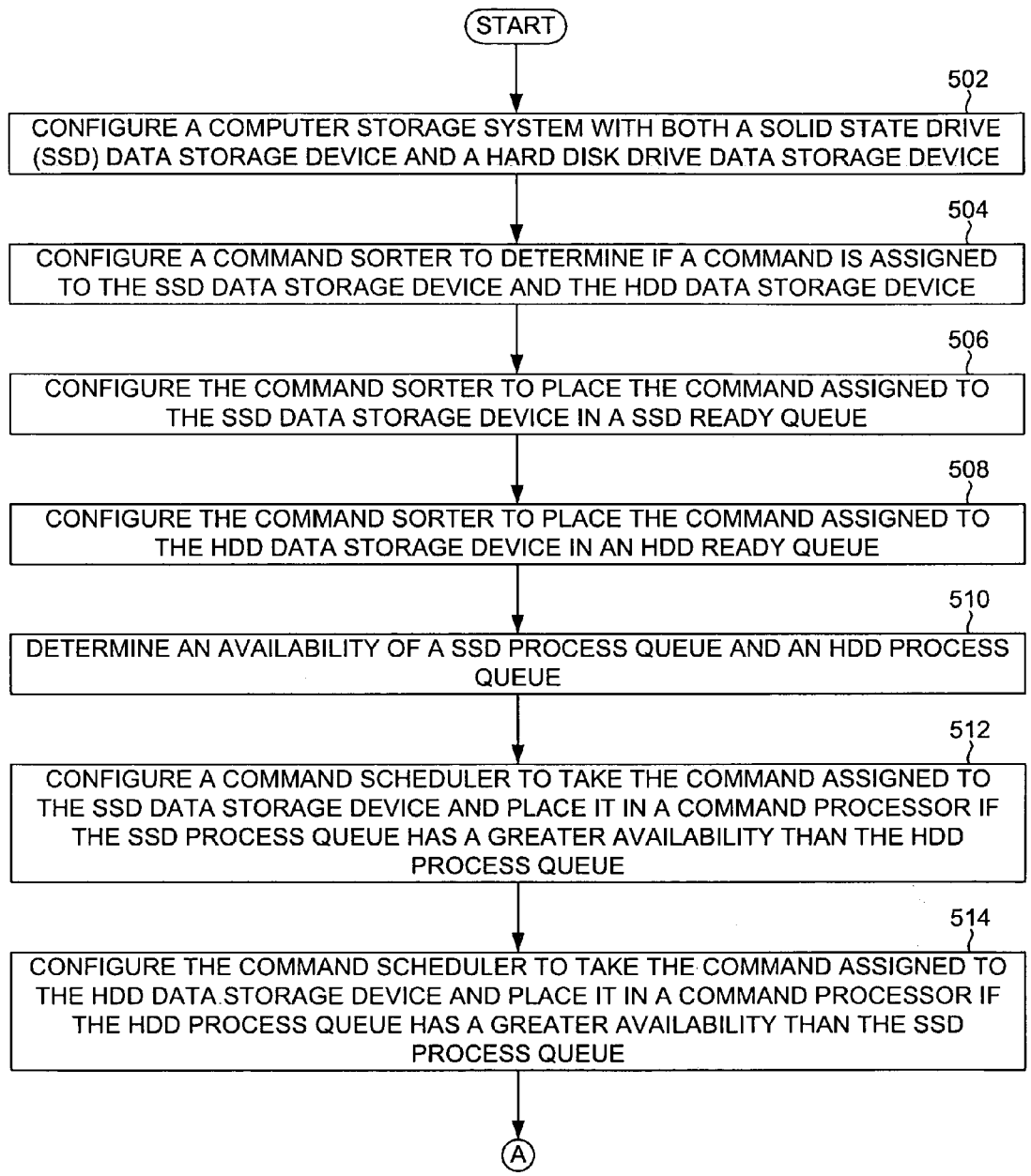
FIG. 5A is a process flow of configuring a computer storage system with both a solid state drive (SSD) data storage device and a hard disk drive data storage device, according to one embodiment.

FIG. 5A is a process flow of configuring a computer storage system with both a solid state drive (SSD) data storage device (e.g., may be the SSD storage device 224A-N of FIG. 2) and a hard disk drive data storage device (e.g., may be the HDD storage device 226A-N of FIG. 2), according to one embodiment. In operation 502, a computer storage system may be configured with both a solid state drive (SSD) data storage device and/or a hard disk drive data storage device. In operation 504, a command sorter 200 may be configured to determine if a command may be assigned to the SSD data storage device and/or the HDD data storage device. In operation 506, the command sorter 200 may be configured to place the command assigned to the SSD data storage device in a SSD ready queue 204.

In operation 508, the command sorter 200 may be configured to place the command assigned to the HDD data storage device in an HDD ready queue 206. In operation 510, an availability of a SSD process queue and/or an HDD process queue may be determined. In operation 512, a command scheduler (e.g., the command scheduler 210 of FIG. 2) may be configured to take the command assigned to the SSD data storage device and place it in a command processor 212 if the SSD process queue may have a greater availability than the HDD process queue. In operation 514, the command scheduler 210 may be configured to take the command assigned to the HDD data storage device and place it in the command processor 212 if the HDD process queue may have a greater availability than the SSD process queue.

Figure 5B:
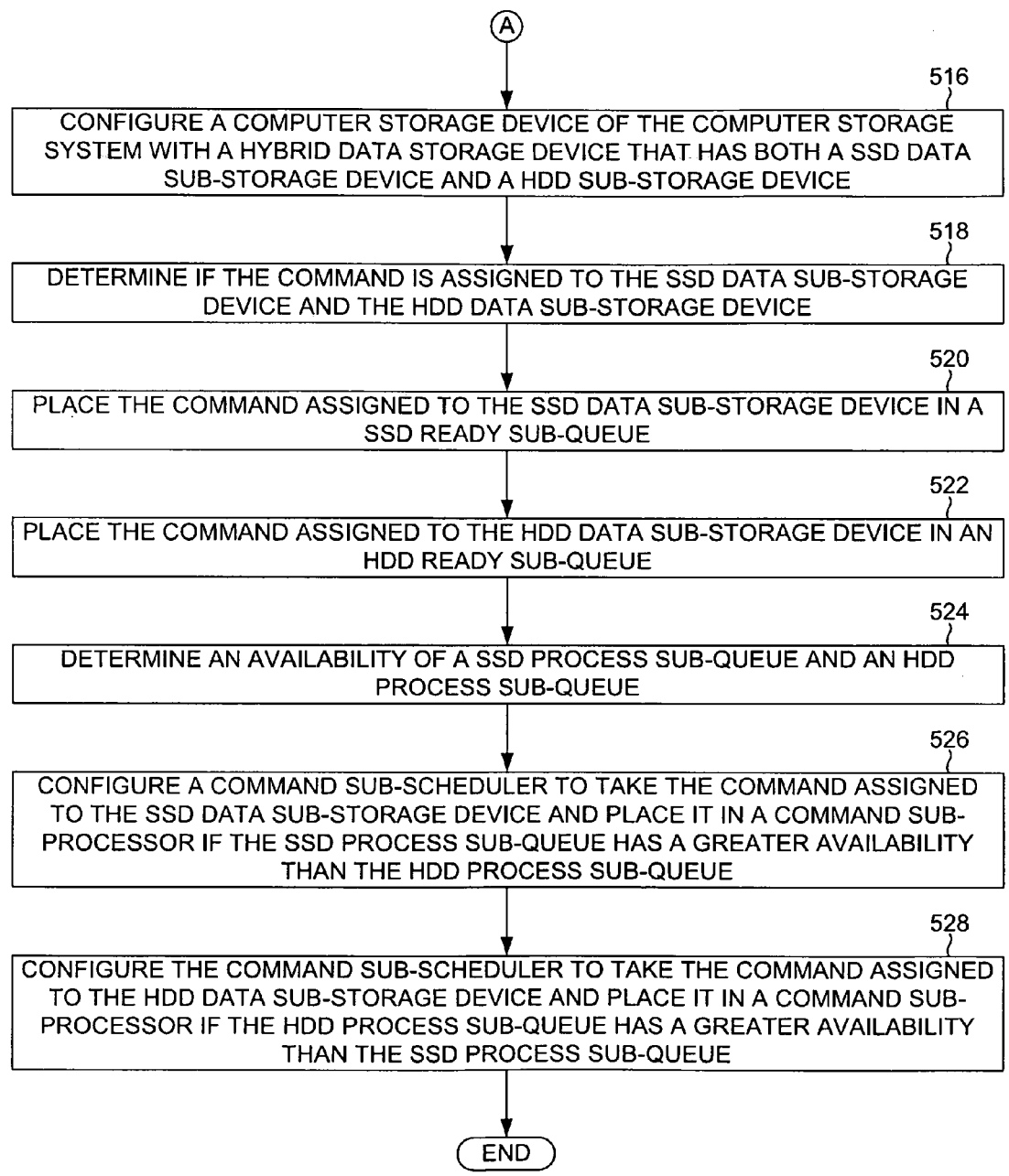
FIG. 5B is a continuation of the process flow of FIG. 5A having additional processes, according to one embodiment.

FIG. 5B is a continuation of the process flow of FIG. 5A having additional processes, according to one embodiment. In operation 516, a computer storage device of the computer storage system may be configured with a hybrid data storage device that may have both a SSD data sub-storage device and/or a HDD sub-storage device. The hybrid data storage device may be a peer device to the SSD data storage device and/or the HDD data storage device. In operation 518, it may be determined if the command is assigned to the SSD data sub-storage device and/or the HDD data sub-storage device.

In operation 520, the command assigned to the SSD data sub-storage device may be placed in a SSD ready sub-queue. In operation 522, the command assigned to the HDD data sub-storage device may be placed in an HDD ready sub-queue. In operation 524, an availability of a SSD process sub-queue and/or an HDD process sub-queue may be determined. In operation 526, a command sub-scheduler may be configured to take the command assigned to the SSD data sub-storage device and place it in a command sub-processor if the SSD process sub-queue may have a greater availability than the HDD process sub-queue. In operation 528, the command sub-scheduler may be configured to take the command assigned to the HDD data sub-storage device and place it in the command sub-processor if the HDD process sub-queue may have a greater availability than the SSD process sub-queue.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the command module 104 of FIGS. 1-5 may be enabled using software and/or using transistors, logic gates, and electrical circuits (e.g., application specific integrated ASIC circuitry) such as a command circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A storage system comprising:
   a plurality of storage devices comprising a first storage device and a second storage device, wherein the first and second storage devices are different types of storage devices, each of the storage devices of the plurality of storage devices corresponding to a respective process queue;
   a command sorter receiving storage commands and placing the storage commands into a plurality of ready queues, the plurality of ready queues including a first ready queue corresponding to a type of storage device of the first storage device and a second ready queue corresponding to a type of storage device of the second storage device, the command sorter placing the storage commands into the plurality of ready queues by determining a target storage device for a given command; and
   a command scheduler taking the storage commands from the ready queues and placing the storage commands into a command processor, the command scheduler placing a particular storage command from its respective ready queue into the command processor based on an availability level of a process queue corresponding to a target device of the particular command; the command processor giving the storage commands to the process queues.

2. The storage system of claim 1, wherein the first ready queue corresponds to a Hard Disk Drive (HDD) type of storage device, and wherein the second ready queue corresponds to a Solid State Drive (SSD) type of storage device.

* * * * *